Patented May 10, 1938

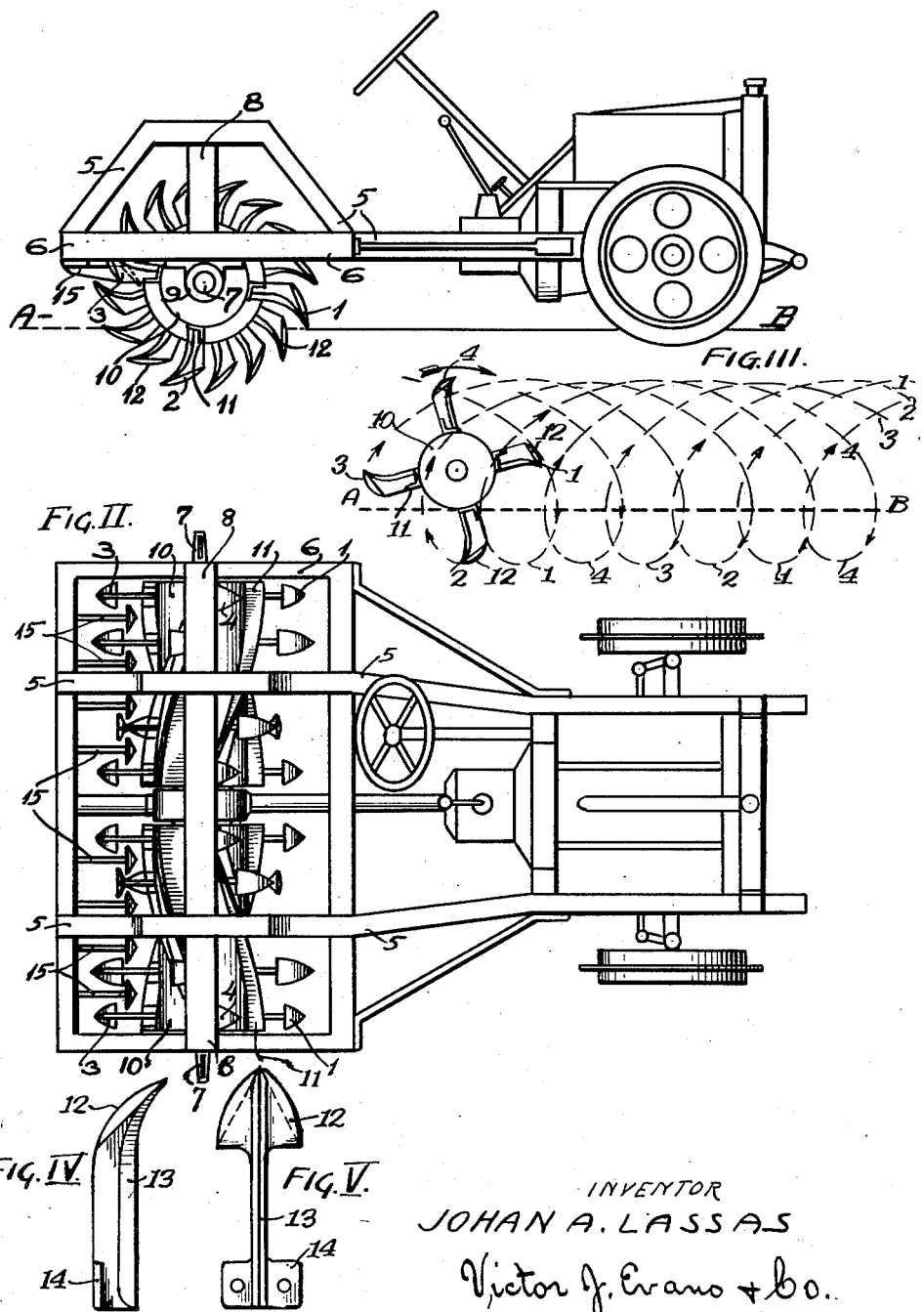

2,117,065

UNITED STATES PATENT OFFICE 2,117,065

MOTOR DRIVEN CULTIVATOR OR HARROW

Johan A. Lassas, Lapptrask, Finland

Application June 1, 1936, Serial No. 82,949

3 Claims. (Cl. 97—40)

The invention relates to an agricultural machine and more especially to motor driven harrows or cultivators.

The primary object of the invention is the provision of a machine of this character, wherein through the rear driving axles of the motor vehicle ground working implements will be operated for the breaking of the surface of the ground or for the working of the soil for the conditioning thereof to the required depth for planting purposes, the broken earth being crumpled to the required fineness as may be desired in the advancement of the machine while advanced movement will be imparted to the machine concurrently with the working of the said ground working elements.

Another object of the invention is the provision of a machine of this character, wherein the motor vehicle may be readily converted for use as a tractor, a ground roller or for cultivating purposes.

A further object of the invention is the provision of a machine of this character, which is comparatively simple in construction, thoroughly reliable and effective in its operation, readily and easily converted for functioning as a tractor, ground roller or agricultural activity, possessed of requisite speed, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure I is a side elevation of the machine constructed in accordance with the invention.

Figure II is a top plan view thereof.

Figure III is a diagrammatic elevation showing the path by dotted lines of motion of the ground working elements or implements of the machine.

Figure IV is a side elevation of one of the ground working implements.

Figure V is a front elevation thereof.

Similar reference characters indicate corresponding parts throughout the several views in the drawing.

Referring to the drawing in detail, particularly Figures I to III, there is suitably connected with the chassis 5 of a motor driven vehicle, for example, of the truck or tractor type and standard in kind, a substantially rectangular shaped rear frame 6 which is disposed transversely of the said chassis at its rear end and the rear driving axles 7 of this motor driven vehicle are journaled with the outer ends of said axles protruded beyond opposite ends of the frame 6 to accommodate rear traction wheels (not shown) when required. The frame 6 is provided with a riser 8 therein and the bearings for the said axles 7 being indicated at 9 and are arranged beneath and at opposite ends of the said frame 6.

Removably fitting the axles 7 at opposite sides of the longitudinal median of the motor vehicle are rotatable cylinders or rollers 10, these being of a determined cross sectional diameter and are susceptible of functioning as traction mediums or as ground rollers as well as carriers for the purpose hereinafter described.

The cylinders or rollers 10 are preferably supported at their inner ends through antifriction bearings interposed between the rear housings for the axles 7 while at their outer ends such cylinders or rollers are detachably splined to the said axles to be positively driven thereby.

Arranged exteriorly on the cylinders or rollers 10 in uniform spaced relation to each other are the helically wound ribs 11 which in one instance function as antiskid cleats for the cylinders or rollers particularly when these are used as traction rollers and as carriers for ground working implements or elements, the ribs 11 being suitably made secure to the said cylinders or rollers in any suitable manner and extend from end to end thereof.

Detachably connected with the ribs 11 are radially disposed ground working implements or elements which are diametrically opposite each other to follow in sequence or numerically 1, 2, 3 and 4 on rotation of the cylinders or rollers 10. Each ground working element may be in the form of a hoe or mattock and in this instance involves a blade 12 formed with a shank 13 having attaching ears 14, the latter being detachably made secure in the proper placing of each element or implement to the rib 11.

The shanks 13 of the elements or implements for their major length are straight and are of such length according to the depth of penetration in the earth of the blade 12 as may be required in the working of the soil. The axles 7 are positively driven from a motor unit of the motor vehicle and the cylinders or rollers 10 are the driving traction mediums for such machine for the advancement thereof over the ground.

At the rearmost portion of the frame 6 are fitted devices 15 for preventing any clods or lumps of earth from rotating with the ground working implements or elements, these devices being adapted to coact with such implements or elements in the working thereof. The devices 15 are extended close to the rollers or cylinders 10 and the same are pointed askew downwardly to thus hold down all the rising lumps of earth while the machine is in action. These devices 15 function as counterground working elements or implements and constitute a combing unit, they being readily detachable from the frame 6 when the occasion requires.

The penetrating depth into the soil by the ground working implements or elements may be varied and also the number and arrangement of such elements changed as the occasion may require.

When the machine is advanced over the ground, the cylinders or rollers under rotation through direct drive from the motor unit of the vehicle cause the implements or elements to swing in the sequence and path numerically indicated 1, 2, 3 and 4, the advancement on the earth AB of the vehicle being aided by the ribs 11 and the cylinders or rollers 10 travel forwardly while the ground working elements or implements have their points describing cycloidic paths as shown at 1, 2, 3 and 4 in Figure III of the drawing on the cycloidic curves, the cylinder radius and the length of the implements or elements forming a two-armed lever with the supporting point thereof at the earth level line AB. The motion of the elements or implements under the ground level AB will be first straight downwardly then backward and upwardly in accordance with the showing in Figure III of the drawing. The sharp edge of each implement or element at opposite side edges of its blade hits and enters the soil substantially vertically and in the most efficient direction for cutting action. As the blade 12 further moves downwardly, backward and upwardly this causes a very efficient working and crumbling of the soil. Under the lifting action of the blades 12 of the said elements or implements rearmost to the axes of rotation of the cylinders or rollers will effectively exert a down pull or hold on the machine against the ground to assure a positive traction for the forward advancement of the said machine.

What is claimed is:

1. In a motor driven harrow or cultivator the combination of a selfpropelled chassis carrying a motor, a shaft journaled on the rear end of said chassis and driven by said motor, two cylinders or rollers arranged coaxially on said shaft, a plurality of spirally wound parallel blade-like ribs on each of said cylinders forming continuous helical flanges extending from one end of the cylinders to the other and adapted to grip the earth, and mattocks each comprising a sharp-edged, blade-shaped head on a sharp-edged shank and mounted on and projecting at equal distances apart from the edges of said ribs and adapted to penetrate and break up the soil, said mattocks being curved so that their points are directed in the direction of travel.

2. In a motor driven harrow or cultivator the combination of a selfpropelled chassis carrying a motor, a shaft journaled on the rear end of said chassis and driven by said motor, two cylinders or rollers arranged coaxially on said shaft, a plurality of spirally wound parallel blade-like ribs on each of said cylinders forming continuous helical flanges extending from one end of the cylinders to the other and adapted to grip the earth, and mattocks each comprising a sharp-edged, blade-shaped head on a sharp-edged shank and mounted on and projecting at equal distances apart from the edges of said ribs and adapted to penetrate and break up the soil, and a stripping means on the rear end of said chassis adapted to strip the earth from said mattocks.

3. In a motor driven harrow or cultivator the combination of a selfpropelled chassis carrying a motor, a shaft journaled on the rear end of said chassis and driven by said motor, two cylinders or rollers arranged coaxially on said shaft, a plurality of spirally wound parallel blade-like ribs on each of said cylinders forming continuous helical flanges extending from one end of the cylinders to the other and adapted to grip the earth, and mattocks each comprising a sharp-edged, blade-shaped head on a sharp-edged shank and mounted on and projecting at equal distances apart from the edges of said ribs and adapted to penetrate and break up the soil, spear-headed tools projecting inwardly from the rear end of said chassis between the path of motion of said mattocks and adapted to break up the sods of earth lifted by said mattocks and strip the earth from these mattocks.

JOHAN A. LASSAS.